(12) United States Patent
Trivedi et al.

(10) Patent No.: US 10,053,763 B2
(45) Date of Patent: Aug. 21, 2018

(54) CARBO-NITRIDING PROCESS FOR MARTENSITIC STAINLESS STEEL AND STAINLESS STEEL ARTICLE HAVING IMPROVED CORROSION RESISTANCE

(75) Inventors: Hitesh K. Trivedi, Fairborn, OH (US); Frederick J. Otto, Pleasant Prairie, WI (US); Timothy W. Piazza, Jamestown, NY (US); Bryan A. McCoy, Jamestown, NY (US); Rabi S. Bhattacharya, Beavercreek, OH (US)

(73) Assignees: AKTIEBOLAGET SKF, Gothenburg (SE); MIDWEST THERMAL-VAC.INC., Kenosha, WI (US); UES INC., Dayton, OH (US)

( * ) Notice: Subject to any disclaimer, the term of this patent is extended or adjusted under 35 U.S.C. 154(b) by 539 days.

(21) Appl. No.: 14/131,225

(22) PCT Filed: May 31, 2012

(86) PCT No.: PCT/US2012/040095
§ 371 (c)(1),
(2), (4) Date: Jan. 7, 2014

(87) PCT Pub. No.: WO2012/166851
PCT Pub. Date: Dec. 6, 2012

(65) Prior Publication Data
US 2014/0305548 A1  Oct. 16, 2014

Related U.S. Application Data

(60) Provisional application No. 61/492,675, filed on Jun. 2, 2011.

(51) Int. Cl.
C23C 8/32 (2006.01)
C23C 8/58 (2006.01)
(Continued)

(52) U.S. Cl.
CPC .............. C23C 8/32 (2013.01); C21D 1/06 (2013.01); C21D 1/25 (2013.01); C21D 6/005 (2013.01);
(Continued)

(58) Field of Classification Search
CPC ....................................................... C23C 8/32
(Continued)

(56) References Cited

U.S. PATENT DOCUMENTS

| 4,154,629 A | 5/1979 | Asai et al. |
| 4,191,599 A | 3/1980 | Stickels et al. |

(Continued)

FOREIGN PATENT DOCUMENTS

| CN | 101338358 A | 1/2009 |
| GB | 1185640 A | 3/1970 |

(Continued)

OTHER PUBLICATIONS

Extended European Search Report from the European Patent Office dated Jul. 16, 2015 in related EP application No. 12792569.1, including European Search Opinion, European Search Report, and examined claims 1-15.

(Continued)

*Primary Examiner* — Brian Walck
(74) *Attorney, Agent, or Firm* — Mark Ussai; J-Tek Law PLLC

(57) ABSTRACT

A method for producing a case-hardened martensitic stainless steel article includes: providing an article comprised, at least in part, of a martensitic stainless steel, carburizing the article within a temperature range of 1625° F.-1680° F. (885° C.-916° C.), and then carbo-nitriding the article within a temperature range of 1575° F.-1625° F. (857° C.-885° C.). An article, such as a bearing ring, comprising such a case-hardened martensitic stainless steel is also disclosed.

19 Claims, 6 Drawing Sheets

(51) Int. Cl.
*C21D 6/00* (2006.01)
*C21D 9/40* (2006.01)
*C21D 1/06* (2006.01)
*C21D 1/25* (2006.01)
*C22C 38/02* (2006.01)
*C22C 38/04* (2006.01)
*C22C 38/44* (2006.01)
*C22C 38/46* (2006.01)
*C22C 38/48* (2006.01)
*C22C 38/52* (2006.01)
*F16C 33/62* (2006.01)
*F16C 33/64* (2006.01)
*C22C 5/04* (2006.01)
*C22C 19/03* (2006.01)

(52) U.S. Cl.
CPC ............. *C21D 6/007* (2013.01); *C21D 9/40* (2013.01); *C22C 38/02* (2013.01); *C22C 38/04* (2013.01); *C22C 38/44* (2013.01); *C22C 38/46* (2013.01); *C22C 38/48* (2013.01); *C22C 38/52* (2013.01); *C23C 8/58* (2013.01); *F16C 33/62* (2013.01); *F16C 33/64* (2013.01); *C21D 2211/008* (2013.01); *C22C 5/04* (2013.01); *C22C 19/03* (2013.01); *F16C 2202/04* (2013.01); *F16C 2204/70* (2013.01)

(58) Field of Classification Search
USPC .................................. 148/218, 219, 316–319
See application file for complete search history.

(56) References Cited

U.S. PATENT DOCUMENTS

| | | | |
|---|---|---|---|
| 5,002,729 A | 3/1991 | Wert et al. |
| 5,019,182 A | 5/1991 | Arimi |
| 5,424,028 A | 6/1995 | Maloney et al. |
| 5,595,610 A | 1/1997 | Maeda et al. |
| 5,595,613 A | 1/1997 | Hatano et al. |
| 5,873,956 A | 2/1999 | Tanaka et al. |
| 5,997,662 A | 12/1999 | Kanetake |
| 6,179,933 B1 | 1/2001 | Dodd et al. |
| 6,248,186 B1 | 6/2001 | Yamamura et al. |
| 6,258,179 B1 | 7/2001 | Takayama et al. |
| 6,309,475 B1 | 10/2001 | Takayama et al. |
| 6,447,619 B1 | 9/2002 | Takayama et al. |
| 7,186,304 B2 | 3/2007 | Chin et al. |
| 7,384,488 B2 | 6/2008 | Sandur |
| 7,422,643 B2 | 9/2008 | Takayama et al. |
| 7,544,255 B2 | 6/2009 | Takayama |
| 7,648,588 B2 | 1/2010 | Hammond et al. |
| 7,691,212 B2 | 4/2010 | Takayama |
| 7,691,213 B2 | 4/2010 | Takayama et al. |
| 2001/0001396 A1 | 5/2001 | Takayama et al. |
| 2001/0048781 A1 | 12/2001 | Kawamura et al. |
| 2002/0037120 A1 | 3/2002 | Tanaka et al. |
| 2002/0119858 A1 | 8/2002 | Kino et al. |
| 2004/0250921 A1 | 12/2004 | Yamaguchi |
| 2005/0133119 A1 | 6/2005 | Hammond et al. |
| 2005/0268990 A1 | 12/2005 | Chin et al. |
| 2006/0029318 A1 | 2/2006 | Beer et al. |
| 2006/0048861 A1 | 3/2006 | Watanabe et al. |
| 2006/0056754 A1 | 3/2006 | Beer et al. |
| 2007/0000576 A1 | 1/2007 | Blanke |
| 2007/0187002 A1 | 8/2007 | Takahashi et al. |
| 2007/0193660 A1 | 8/2007 | Hammond et al. |
| 2008/0107917 A1 | 5/2008 | Rai et al. |
| 2009/0176142 A1 | 7/2009 | Abd Elhamid et al. |
| 2010/0058592 A1 | 3/2010 | Streit et al. |
| 2010/0314005 A1 | 12/2010 | Saito et al. |
| 2011/0036462 A1 | 2/2011 | Berlier et al. |
| 2012/0018052 A1 | 1/2012 | Moyer |
| 2012/0020605 A1 | 1/2012 | Mori |
| 2012/0255653 A1 | 10/2012 | Chin et al. |
| 2017/0016084 A1 | 1/2017 | Chin et al. |

FOREIGN PATENT DOCUMENTS

| | | |
|---|---|---|
| GB | 2205110 A | 11/1988 |
| GB | 2328953 A | 3/1999 |
| WO | 2010110145 A1 | 9/2010 |

OTHER PUBLICATIONS

International Preliminary Report on Patentability for Parent Application No. PCT/US2012/040095.
International Search Report for Parent Application No. PCT/US2012/040095.

US 10,053,763 B2

CARBO-NITRIDING PROCESS FOR MARTENSITIC STAINLESS STEEL AND STAINLESS STEEL ARTICLE HAVING IMPROVED CORROSION RESISTANCE

CROSS-REFERENCE

This application is the U.S. National Stage of PCT/US2012/040095, which claims priority to U.S. provisional patent application No. 61/492,675, filed on Jun. 2, 2011, the contents of which are fully incorporated herein by reference.

STATEMENT REGARDING FEDERALLY SPONSORED RESEARCH OR DEVELOPMENT

The Government of the United States of America may have rights in this invention as a result of contract numbers N68335-09-C-0227 and N68335-11-C-0395 awarded by the Department of Navy.

TECHNICAL FIELD

The present invention generally relates to a method for treating martensitic stainless steel, an article produced thereby and a bearing ring.

DESCRIPTION OF RELATED ART

High performance mechanical systems, such as bearing and gears in advanced gas turbine engines, are required to operate at ever increasing speeds, temperatures and loads. Advanced high temperature case hardened bearing steel, such as Pyrowear® 675, has been developed for these applications. The basic mechanical properties and desired microstructure can be achieved by conventional carburizing techniques, but corrosion resistance is not substantially better than conventional bearing steels such as M50 and 440C.

Pyrowear® 675 is a stainless steel product of Carpenter Technology (www.cartech.com) and contains the following elements by wt %: 0.07 C, 0.65 Mn, 0.40 Si, 13.00 Cr, 2.60 Ni, 1.80 Mo, 0.60 V, 5.40 Co, balance Fe.

Carbo-nitriding is a surface modification process utilized to increase the surface hardness of metals by introducing both carbon and nitrogen into the metal matrix (case). This process is accomplished by diffusion of the carbon and nitrogen at elevated temperatures according to one of several known methods. For example, gas carbo-nitriding is one known method that has been successfully demonstrated on many metals to increase surface hardness of low carbon metals up to a surface hardness of HRc 60-62 (697-745 HV).

Known techniques for carburizing and/or carbo-nitriding stainless steel alloys are disclosed in GB 2 238 953, U.S. Pat. Nos. 4,154,629, 5,873,956, 7,186,304, 7,648,588, 6,179,933 and 5,873,956, and US Patent Publication No. 2002/0037120.

SUMMARY

However, known techniques for carburizing and/or carbo-nitriding stainless steel alloys have not been capable of achieving high corrosion resistance while maintaining satisfactory mechanical properties and microstructure.

It is therefore an object of the present teachings to disclose an improved thermal process for carbo-nitriding martensitic stainless steel, such as Pyrowear® 675, as well as improved articles containing such steel, such as bearing rings. Such articles preferably provide enhanced corrosion resistance while maintaining satisfactory mechanical properties and microstructure.

According to one aspect of the present teachings, a process and an article are disclosed, in which carbon and nitrogen are simultaneously introduced into the surface (case) of the stainless steel (e.g., Pyrowear® 675), preferably at a relatively low pressure vacuum. This heat treatment process comprises first carburizing the stainless steel to produce the desired hard case depth at a higher furnace (soaking) temperature, followed by a combined carburizing-nitriding cycle at a lower furnace temperature.

Carburizing is preferably accomplished by introduction of a saturating amount of carbon, such as acetylene or propane, into the atmosphere so as to coat or cover the surface of the metal, followed by a diffusion phase, in which the vacuum chamber is evacuated to a sub-atmosphere pressure while maintaining the soaking temperature constant or at least relatively constant.

Subsequent to the carburizing cycle, nitrogen (e.g. ammonia or $N_2$) is then introduced into the carburizing atmosphere in the form of a gas to create a top or outer metal layer (case) having both carbon and nitrogen present in the form of metal carbides and metal nitrides. The carbo-nitriding cycle is preferably performed in substantially the same way, albeit preferably at a lower soaking temperature than in the carburizing cycle.

The metal part is then preferably quenched and tempered to produce the desired hardness, microstructure and retained austenite.

Further embodiments of the present teachings include, but are not limited to:

1. A method comprising:
   (a) placing an article into a vacuum chamber, the article being comprised of a martensitic stainless steel consisting essentially of 0.02-0.50 wt % C, 0.1-1.5 wt % Mn, 0.10-2.0 wt % Si, 8.0-20.0 wt % Cr, 1.0-3.5 wt % Ni, 0.40-3.0 wt % Mo, 0.40-2.0 wt % V, 1.0-10.0 wt % Co, the balance being Fe (and unavoidable impurities),
   (b) vacuum carburizing the article within a temperature range of 1625° F.-1680° F. (885° C.-916° C.) by repeating a plurality of cycles comprising (i) introducing acetylene and/or propane into the vacuum chamber and (ii) then evacuating the vacuum chamber to about 0.1 atm (about 10 kPa), and
   (c) then vacuum carbo-nitriding the article within a temperature range of 1575° F.-1625° F. (857° C.-885° C.) by repeating a plurality of cycles comprising (i) introducing acetylene and/or propane and ammonia into the vacuum chamber and (ii) then evacuating the vacuum chamber to about 0.1 atm (about 10 kPa).

2. A method comprising:
   (a) providing an article comprised, at least in part, of a martensitic stainless steel,
   (b) carburizing the article within temperature range of 1625° F.-1680° F. (885° C.-916° C.), and
   (c) then carbo-nitriding the article within a temperature range of 1575° F.-1625° F. (857° C.-885° C.), thereby producing a case-hardened martensitic stainless steel article.

3. The method according to the above-mentioned embodiment 2, wherein the stainless steel in step (a) consists essentially of 0.02-0.50 wt % C, 0.1-1.5 wt % Mn, 0.10-2.0 wt % Si, 8.0-20.0 wt % Cr, 1.0-3.5 wt % Ni, 0.40-3.0 wt % Mo, 0.40-2.0 wt % V, 1.0-10.0 wt % Co, the balance being Fe (and unavoidable impurities).

4. The method according to any preceding above-mentioned embodiment, wherein stainless steel in step (a) consists essentially of 0.03-0.10 wt % C, 0.5-1.0 wt % Mn, 0.20-0.6 wt % Si, 11.0-15.0 wt % Cr, 2.40-3.0 wt % Ni, 1.50-2.0 wt % Mo, 0.40-0.80 wt % V, 5.0-6.0 wt % Co, the balance being Fe (and unavoidable impurities).

5. The method according to the above-mentioned embodiment 4, wherein the stainless steel in step (a) contains the following weight percentages of elements:
Mo+V=0.8 to 4.0 wt % and
Co+Ni=2.0 to 12.0 wt %.

6. The method according to any preceding above-mentioned embodiment, wherein the stainless steel in step (a) consists of 0.07 C, 0.65 Mn, 0.40 Si, 13.00 Cr, 2.60 Ni, 1.80 Mo, 0.60 V, 5.40 Co, the balance being Fe (e.g., Pyrowear® 675), or the stainless steel is CSS-42L of Latrobe Specialty Steel (0.12 C, 14.00 Cr, 0.60 V, 2.00 Ni, 4.75 Mo, 12.5 Co, 0.02 Cb, the balance being Fe).

7. The method according to any preceding above-mentioned embodiment, wherein the nitrogen:carbon (e.g., ammonia:acetylene or propane/acetylene) differential ratio in step (c) is between about 6-8:1.

8. The method according to any preceding above-mentioned embodiment, wherein the total time for steps (b) and (c) is between 15-18 hours.

9. The method according to any preceding above-mentioned embodiment, wherein the carbo-nitrided article possesses a hard carburized case up to a depth of 900-1125 μm (38-45 mil).

10. The method according to any preceding above-mentioned embodiment, wherein the carbo-nitrided article exhibits a presence of nitrogen (nitrides) at least up to depth of 250 μm (10 mil).

11. The method according to any preceding above-mentioned embodiment, wherein the carbo-nitrided article contains approximately 0.5 wt % nitrogen at the surface and approximately 0.2 wt % nitrogen at a depth of about 250 μm (10 mil).

12. The method according to any preceding above-mentioned embodiment, wherein the carbo-nitrided article contains carbon in the range of 1.5-2 wt % in the hardened case, preferably at least up to a depth of 500 μm.

13. The method according to any preceding above-mentioned embodiment, wherein the carbo-nitrided article is subsequently:
(d) quenched in gaseous nitrogen and
(e) then tempered twice at about 575° F.-625° F. (301° C.-329° C.) for about 2 hours.

14. The method according to any preceding above-mentioned embodiment, wherein the carbo-nitrided article has a Vickers hardness of about 840 HV (65.0 HRc).

15. The method according to any preceding above-mentioned embodiment, wherein the case of the article has a hardness of at least 800 Hv (~63.7 HRc) at a depth between 0.010 to 0.039 in (0.25 to 1.0 mm).

16. The method according to any preceding above-mentioned embodiment, wherein the case of the article has a hardness of between 800-850 Hv (~63.7 to 65.4 HRc) at a depth between 0.010 to 0.039 in (0.25 to 1.0 mm).

17. The method according to any preceding above-mentioned embodiment, wherein the case of the article has a hardness of at least 63 HRc (~772 HV) at 149° C. (300° F.).

18. The method according to any preceding above-mentioned embodiment, wherein the case of the article has a hardness of at least 62 HRc (~745 HV) at 204° C. (400° F.).

19. The method according to any preceding above-mentioned embodiment, wherein the carbo-nitrided article contains at least 0.5 wt % nitrogen in at least one portion of the hardened case and at least 0.2 wt % nitrogen at a depth of about 200 μm (8 mil).

20. The method according to any preceding above-mentioned embodiment, wherein the carbo-nitrided article exhibits a residual stress of at least 500 MPa in the hardened case.

21. The method according to any preceding above-mentioned embodiment, wherein at least one portion of the hardened case of the carbo-nitrided article comprises at least 16 volume percent of retained austenite.

22. The method according to any preceding above-mentioned embodiment, wherein the article is a bearing ring.

23. An article produced according to the method of any preceding above-mentioned embodiment.

24. A bearing ring comprised of a carbo-nitrided martensitic stainless steel having:
a hard carburized case up to a depth of about 900-1125 μm (38-45 mil),
a presence of nitrogen or nitrides up to depth of 250 μm (10 mil),
about 0.3-0.7 wt %, preferably about 0.5 wt %, nitrogen at the surface and about 0.1-0.3 wt %, preferably about 0.2 wt %, nitrogen at a depth of about 250 μm (10 mil), and
carbon in the range of 1.5-2 wt % in the hardened case.

25. The bearing ring according to the above-mentioned embodiment 24, wherein the bearing ring has a core consisting essentially of 0.02-0.50 wt % C, 0.1-1.5 wt % Mn, 0.10-2.0 wt % Si, 8.0-20.0 wt % Cr, 1.0-3.5 wt % Ni, 0.40-3.0 wt % Mo, 0.40-2.0 wt % V, 1.0-10.0 wt % Co, the balance being Fe (and unavoidable impurities).

26. The bearing ring according to the above-mentioned embodiment 24, wherein the bearing ring has a core consisting essentially of 0.03-0.10 wt % C, 0.5-1.0 wt % Mn, 0.20-0.6 wt % Si, 11.0-15.0 wt % Cr, 2.40-3.0 wt % Ni, 1.50-2.0 wt % Mo, 0.40-0.80 wt % V, 5.0-6.0 wt % Co, the balance being Fe (and unavoidable impurities).

27. The bearing ring according to the above-mentioned embodiments 24-26, wherein the bearing ring has a core containing the following weight percentages of elements:
Mo+V=0.8 to 4.0 wt % and
Co+Ni=2.0 to 12.0 wt %.

28. The bearing ring according to the above-mentioned embodiments 24-27, wherein the bearing ring has a core consisting of 0.07 C, 0.65 Mn, 0.40 Si, 13.00 Cr, 2.60 Ni, 1.80 Mo, 0.60 V, 5.40 Co, the balance being Fe (e.g., Pyrowear® 675), or 0.12 C, 14.00 Cr, 0.60 V, 2.00 Ni, 4.75 Mo, 12.5 Co, 0.02 Cb, the balance being Fe (e.g., CSS-42L of Latrobe Specialty Steel).

29. The bearing ring according to the above-mentioned embodiments 24-28, wherein the hardened case of the bearing ring has a hardness of at least 800 Hv (~63.7 HRc) at a depth between 0.010 to 0.039 in (0.25 to 1.0 mm).

30. The bearing ring according to the above-mentioned embodiments 24-29, wherein the hardened case of the bearing ring has a hardness of between 800-850 Hv (~63.7 to 65.4 HRc) at a depth between 0.010 to 0.039 in (0.25 to 1.0 mm).

31. The bearing ring according to the above-mentioned embodiments 24-30, wherein the hardened case of the bearing ring has a hardness of at least 63 HRc (~772 HV) at 149° C. (300° F.).

32. The bearing ring according to the above-mentioned embodiments 24-31, wherein the hardened case of the bearing ring has a hardness of at least 62 HRc (~745 HV) at 204° C. (400° F.).

33. The bearing ring according to the above-mentioned embodiments 24-32, wherein the hardened case of the bearing ring exhibits a residual stress of at least 500 MPa.

34. The bearing ring according to the above-mentioned embodiments 24-33, wherein at least one portion of the hardened case of the bearing ring comprises at least 16 volume percent of retained austenite.

Further objects, embodiments, advantages and designs will be explained in the following with the assistance of the exemplary embodiments and the appended Figures.

DETAILED DESCRIPTION OF THE INVENTION

Although the following description primarily concerns Pyrowear® 675 (hereinafter "P675") samples that were carbo-nitrided using different process parameters based on application requirements, the present teachings are also applicable to other martensitic stainless steels having similar elemental compositions, such as e.g., CSS-42L of Latrobe Specialty Steel Company, Latrobe, Pa., U.S.A.

The initial carburizing cycle was conducted in a temperature range of 1625° F.-1680° F. (885° C.-916° C.) followed by a carbo-nitriding cycle in the temperature range of 1575° F.-1625° F. (857° C.-885° C.). The heat treat cycle time can be between 15-18 hours to produce a hard carburized case up to a depth of 900-1125 μm (38-45 mil). Saturation/diffusion cycles were alternately and repeatedly performed, in which acetylene was introduced into a vacuum chamber containing the steel and then a vacuum is drawn to about 0.1 atm (about 10 kPa). During the carbo-nitriding cycle, ammonia was simultaneously introduced together with the acetylene, followed again by the evacuation/diffusion phase. During the low pressure phases, carbon (and nitrogen, if present) contacting the surface of the metal diffuses into the surface (case) of the metal. The respective soaking temperatures were held constant during both phases.

The carbo-nitrided stainless steel may then be quenched in liquid nitrogen (about −196° C.), followed by tempering twice at 600° F. (315° C.) for 2 hours. The resulting carbo-nitrided stainless steel had a Vickers hardness of about 840 HV (65.0 HRc).

In the carbo-nitriding step, the ammonia-to-carbon differential ratio can preferably be in the range of 6-8:1. In such an embodiment, the hardened case of the article exhibits a presence of nitrogen up to a depth of 250 μm (10 mil). Approximately 0.5 wt % nitrogen was detected at the surface and 0.2 wt % nitrogen was detected to the depth of about 250 μm (10 mil). The process resulted in a carbon content in the hardened case in the range of 1.5-2 wt %. X-ray diffraction (XRD) results showed the formation of different metal nitrides ($M_xN$ & MN, where M represents metal) not present in carburized P675. The process formed $Fe_xN$, $Cr_xN$, $V_xN$, as will be discussed further below.

Figure 10:
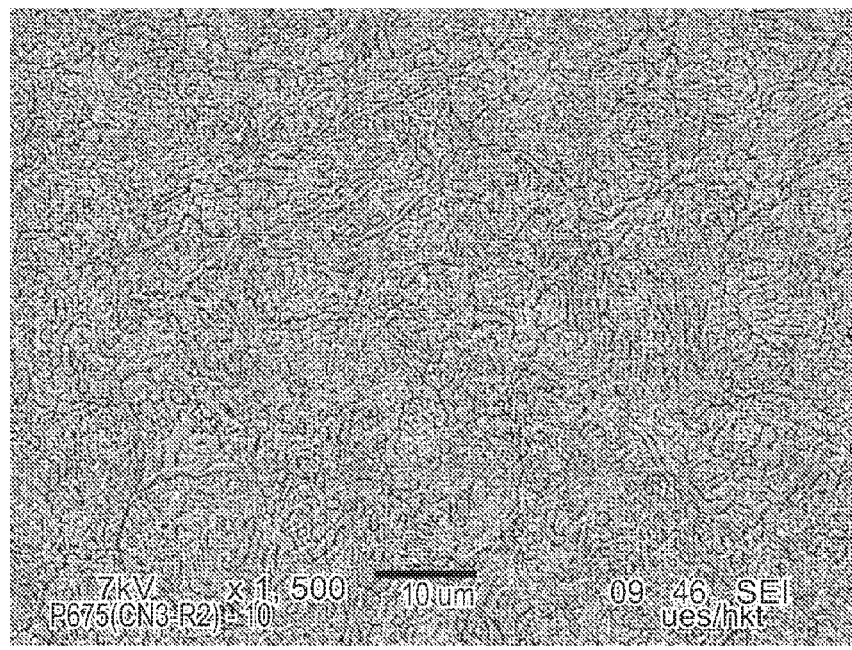
FIG. 10 shows a SEM Micrograph of carbo-nitrided Pyrowear® 675.

The heat-treatment process according to the present teachings resulted in finely distributed carbides without carbide segregation at grain boundaries, as shown in FIG. 10. A significant improvement in hardness profile, hot hardness and residual stress profiles were also observed, as will be discussed below. Furthermore, anodic polarization corrosion tests showed significant improvement in corrosion performance of carbo-nitrided (C—N) Pyrowear® 675. For example, the carbo-nitrided P675 exhibited at least 50% lower corrosion rate/yr as compared to a carburized P675 sample.

Further characterizing data is provided in the following, in which a P675 sample that was carbo-nitrided according to the above-mentioned process conditions (hereinafter "the carbo-nitrided P675 specimen") is compared to a P675 sample that was only carburized and the carbo-nitriding step was omitted (hereinafter "the carburized P675 specimen").

Hardness Depth Profile

Figure 1:
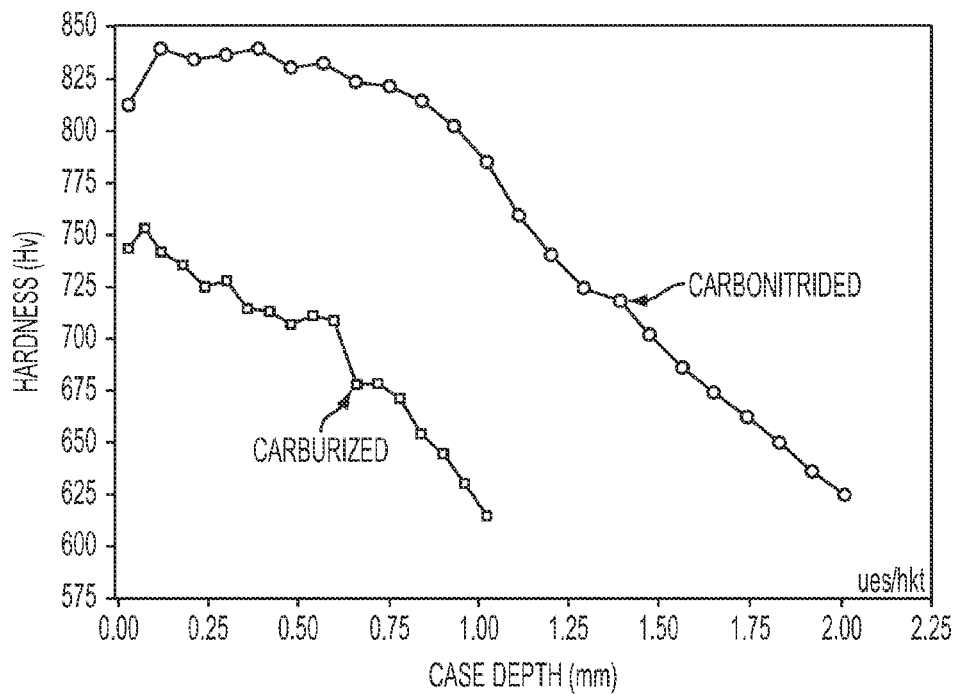
FIG. 1 shows a hardness depth profile for carburized and carbo-nitrided Pyrowear® 675 tempered at 600° F. (2 times for 2 hours).

The carburized and carbo-nitrided P675 specimens were cross sectioned and polished for hardness measurements. Micro-hardness at room temperature was measured as a function of depth (case to core). Three hardness measurements were taken at each depth and average hardness are reported. The hardness profiles for carbo-nitrided (C—N) samples are shown in FIG. 1. A significant increase in hardness was observed with the carbo-nitrided P675 specimen in comparison with the carburized P675 specimen. While not wishing to be bound by theory, the substantial improvement in hardness of C—N material over the carburized P675 specimen is believed to be a significant factor in improving fatigue life and reducing wear rate, as will be demonstrated below.

Hot Hardness Measurement

Figure 2:
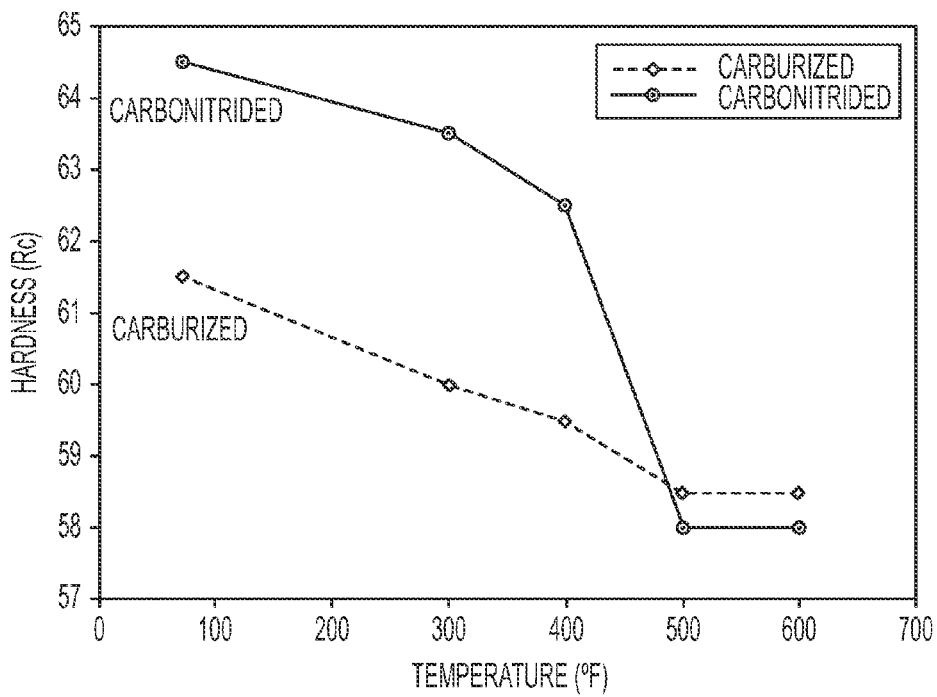
FIG. 2 shows the hot hardness of carburized and carbo-nitrided Pyrowear® 675 up to 600° F.

Hot hardness measurements for the carburized and carbo-nitrided P675 specimens were performed at room temperature, 149° C. (300° F.), 204° C. (400° F.), 260° C. (500° F.) and 315° C. (600° F.). Five hardness measurements were taken at each temperature and average hardness are reported. Hardness was measured using Rockwell A scale and then converted to Rockwell C scale. The hardness of the carbo-nitrided P675 specimen is compared to the carburized P675 specimen in FIG. 2. The carbo-nitrided P675 specimen exhibited a hot hardness profile superior to the carburized P675 specimen. While not wishing to be bound by theory, the substantial improvement in hot harness of carbo-nitrided material over carburized materials is believed to be a significant factor in improving fatigue life and allowing higher operating temperatures, as will be demonstrated below.

Corrosion Test

An anodic polarization test was used to quantify the corrosion resistance of the carburized and carbo-nitrided P675 specimens. The tests were conducted in 5% NaCl solution. When steel, particularly steel having a high Cr content, i.e. corrosion resistant steel, is exposed to a chloride-containing medium, it experiences a localized corrosion, i.e. corrosion pitting, rather than uniform corrosion. To determine the corrosion resistance of a material, the voltage at which the material begins to pit, i.e. the pitting potential (Epit), is determined from the polarization curve. The more positive (higher) the pitting potential, the more resistant the material is to pitting corrosion.

The experimental test conditions and parameters were as follows. All samples were prepared by polishing to 600 grit (SiC paper), then rinsing with water, acetone, methanol, DI water and finally air drying. After drying, the samples were allowed to sit for at least 2 hours prior to testing.

Anodic potentiodynamic scans were performed using a testing solution of simulated seawater (0.8 M NaCl). The open circuit potential (OCP) was monitored for 10 minutes prior to performing the scan to ensure stability of the corrosion potential. Polarization scan limits were performed from −0.1 (V) vs. OCP to +0.25 (V) vs. OCP. The scan rate was 0.5 mV/sec. The reference electrode used in all tests was saturated KCl.

Bearing steel samples were tested by mounting each sample on the side of an electrochemical cell so that only the polished face was exposed to the testing solution. The working electrode (bearing steel sample) was mounted on the face of the corrosion cell and experiments were performed using a calomel reference electrode (SCE) and an expanded platinum mesh counter electrode. The electrical connection to the working electrode was made by spot welding pure nickel wire to the edge of the sample. The corrosion rate was calculated from a Tafel fit software.

Figure 3:
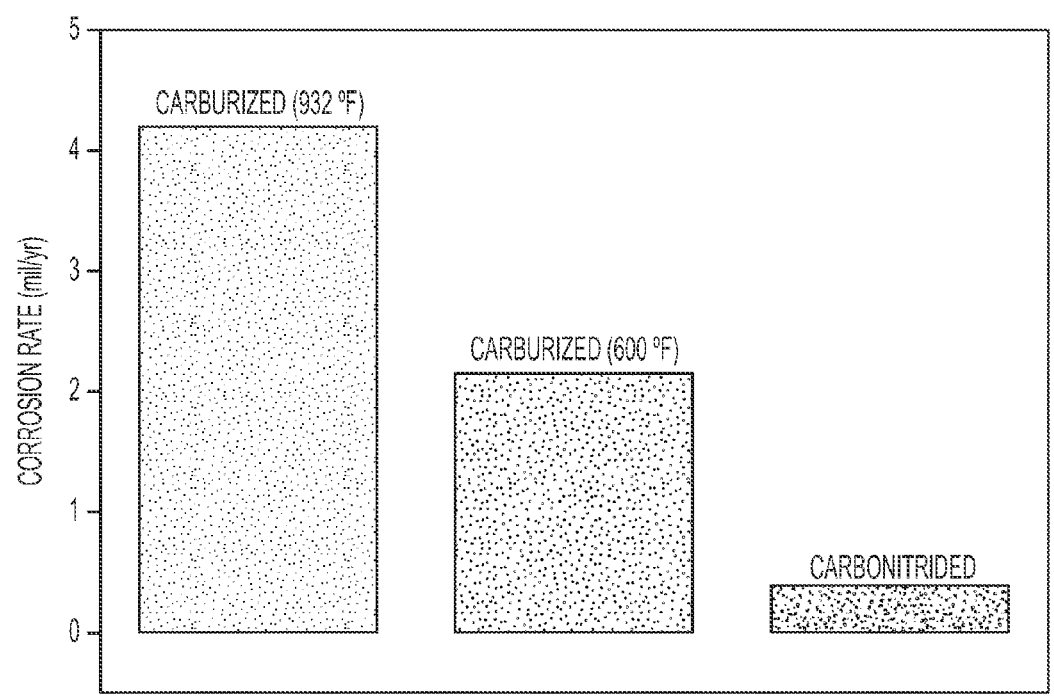
FIG. 3 shows a corrosion rate comparison between carburized and carbo-nitrided Pyrowear® 675.

As shown in FIG. 3, the carbo-nitrided P675 specimen exhibited a corrosion rate that was an order of magnitude lower than the two carburized P675 specimens (tempered respectively at 932° F. and 600° F.).

Corrosion is one of the main causes of bearing and gear failure. Use of highly corrosion resistant bearing material has the potential to significantly improve safety and reliability of advanced turbine engines. Improved bearing and gear material treated with the process according to the present teachings may also be advantageously utilized in a variety of high performance military and commercial aircraft turbine engines. Commercial and military ground vehicles also may benefit from the present teachings, as the present process is capable of improving corrosion resistance and thus system reliability and safety.

X-Ray Diffraction Analysis

Figure 4:
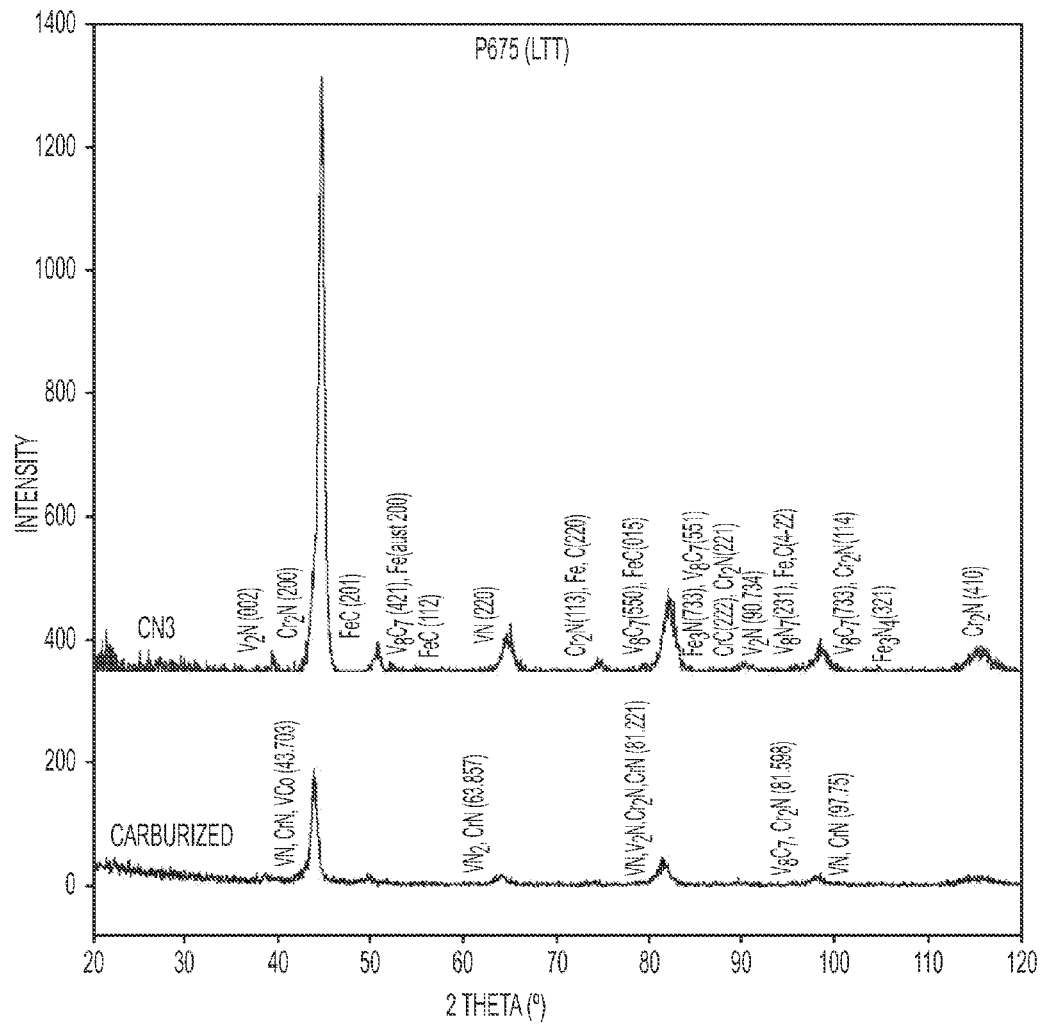
FIG. 4 shows XRD results for carburized and carbo-nitrided Pyrowear® 675.

The carburized and carbo-nitrided P675 specimens were analyzed by XRD technique to determine phases formed by each process. Introduction of nitrogen by the carbo-nitriding (C—N) process resulted in formation of additional metal nitrides (MN & $M_xN$, wherein M represents metal) in the hard case as shown in FIG. 4. While not wishing to be bound by theory, the formation of these metal nitrides is believed to be important to improving corrosion resistance.

Metal nitrides included in the case of the carbo-nitrided steel specimen include one or more of $V_2N$, $Cr_2N$, VN, $Fe_3N$ and $Fe_3N_4$.

Carbon-Nitrogen Determination

Auger electron spectroscopy (AES) was used to determine the weight percentages of nitrogen and carbon. The specimens were cross-sectioned and polished for AES analysis. After polishing, the specimens were removed from their mount and rinsed with acetone prior to analysis. The specimens were loaded into the AES vacuum system along with a polished 1074 steel sample and a sample of 99.9% iron foil, which were used as references. The AES vacuum system was baked overnight to achieve a base pressure in the $10^{-10}$ Torr range. This is necessary in order to attain a very low background carbon level. This work was done using a Varian model 981-2707 Auger spectrometer. The electron beam diameter for this work was ~20 μm.

Figure 5:
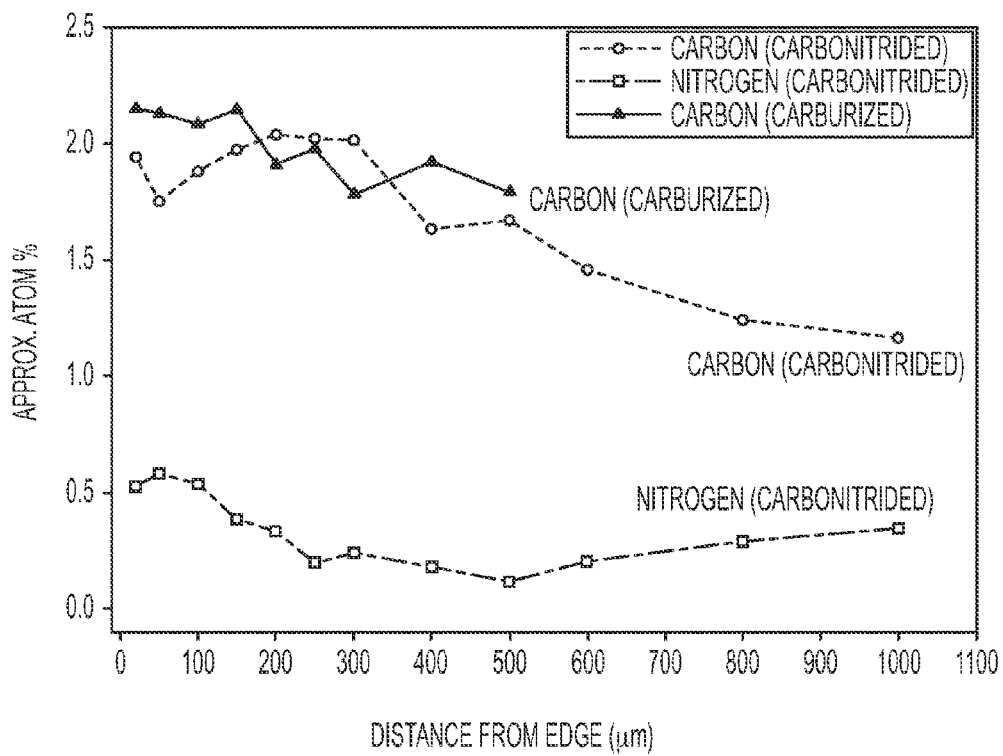
FIG. 5 shows an approximate atom wt % of carbon and nitrogen as determined by Auger Electron Spectroscopy (AES).

Before initiating the profiles, the samples were argon ion-sputtered for several minutes in order to remove residual surface contaminants. The ion gun was left on during the profiles in order to avoid any re-contamination. A carbon level of 1.09±0.04 wt % was measured on the 1074 steel sample, as compared with the expected composition range of 0.70-0.80 wt %. For the iron foil, the carbon level was measured to be <0.2 wt %. Nitrogen in the range of 0.2 to 0.6 wt % was detected up to the depth of ~250 μm (10 mil) as shown by AES nitrogen profile in FIG. 5.

Residual Stress

X-ray diffraction residual stress measurements were made at the surface and at nominal depths of 0.5, 1.0, 2.0, 3.0, 5.0, 7.0 and $10.0 \times 10^{-3}$ in. (13, 25, 51, 76, 127, 178 and $254 \times 10^{-3}$ mm). Measurements were made in the radial direction at the center of the flat face.

X-ray diffraction residual stress measurements were performed using a two-angle sine-squared-psi technique, in accordance with SAE HS-784, employing the diffraction of chromium K-alpha radiation from the (211) planes of the BCC structure of the Pyrowear® 675. The diffraction peak angular positions at each of the psi tilts employed for measurement were determined from the position of the K-alpha 1 diffraction peak separated from the superimposed K-alpha doublet assuming a Pearson VII function diffraction peak profile in the high back-reflection region. The diffracted intensity, peak breadth, and position of the K-alpha 1 diffraction peak were determined by fitting the Pearson VII function peak profile using a least squares regression after correction for the Lorentz polarization and absorption effects and for a linearly sloping background intensity. Material was removed electrolytically for subsurface measurements in order to minimize possible alteration of the subsurface residual stress distribution as a result of material removal.

All data obtained as a function of depth were corrected for the effects of the penetration of the radiation employed for residual stress measurement into the subsurface stress gradient. The stress gradient correction applied to the last depth measured is based upon an extrapolation to greater depths and may result in over correction at the last depth if the stress profile has been terminated in the presence of a steep gradient. Corrections for sectioning stress relaxation and for stress relaxation caused by layer removal are applied as appropriate.

Figure 6:
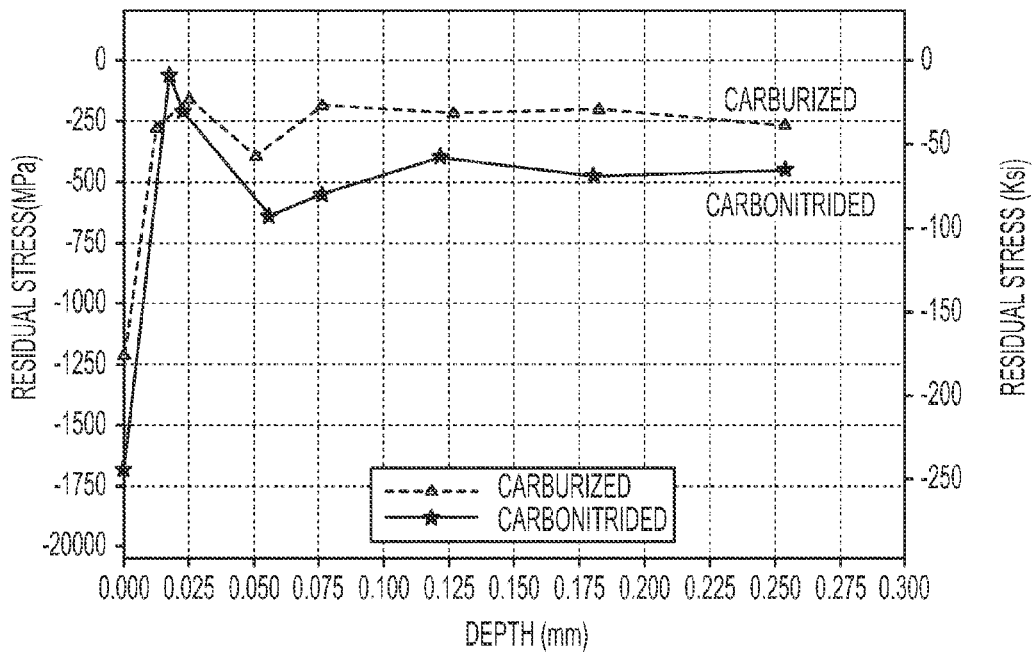
FIG. 6 shows residual stress profiles of carburized and carbo-nitrided Pyrowear® 675.

As was noted above, X-ray diffraction residual stress measurements were made at the surface and at nominal depths of 0.5, 1.0, 2.0, 3.0, 5.0, 7.0 and $10.0 \times 10^{-3}$ in. (13, 25, 51, 76, 127, 178 and $254 \times 10^{-3}$ mm). X-ray diffraction technique was used to measure residual stress and retained austenite as a function of depth. As shown in FIG. 6, the carbo-nitriding process according to the present teachings produced higher compressive stresses, which are desirable to improve fatigue life.

Retained Austenite Measurements

Figure 7:
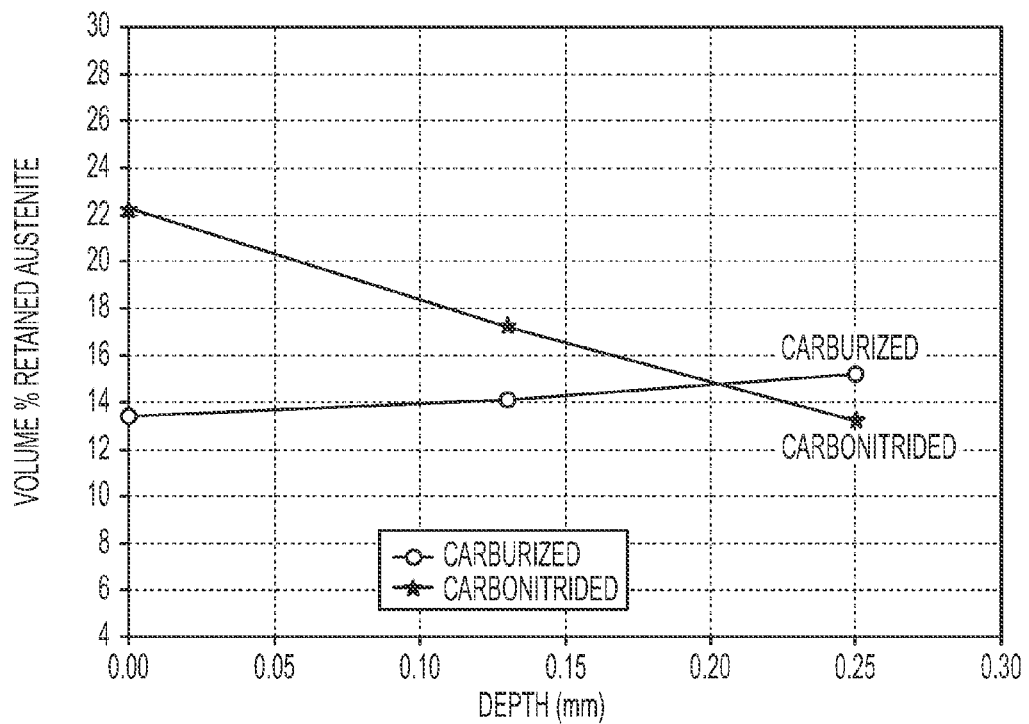
FIG. 7 shows retained austenite profiles of carburized and carbo-nitrided Pyrowear® 675.

The mean volume percent of retained austenite (RA) calculated from the four independently determined diffraction peak integrated intensity ratios and the standard deviation about the mean value are presented in FIG. 7. Uncertainties in austenite measurement that exceed one percent may be the result of preferred orientation present in a sample. In all x-ray diffraction quantitative analysis methods, the crystals in the sample are assumed to be randomly oriented so that the diffraction peak integrated intensities vary only with the relative volume fractions of the phases present. Standard deviations on the order of one volume percent are attainable on samples that have truly random orientation. However, because the relative intensities of the diffraction peaks for each phase depend upon the crystal structure and the preferred orientation (texture) present, the variation between the individual austenite results reported is not actually random experimental error.

Previous studies comparing the results obtained on orthogonal faces of highly textured steels have shown that the mean austenite content calculated is generally more reliable than indicated by the "standard deviation" reported. Carbide peaks near the austenite and martensite peaks may contribute to the integrated intensity and cause additional error and are avoided whenever possible. Performance of the technique is monitored using a secondary reference standard which is certified to contain 25.4% austenite with reference to NIST Standard Reference Material No. 487.

A measurement on this sample during the investigation produced a value of 25.0±0.5 percent. The RA profiles for the carburized and carbo-nitrided P675 specimens are shown in FIG. 7.

Rolling Contact Fatigue Testing

Figure 8:
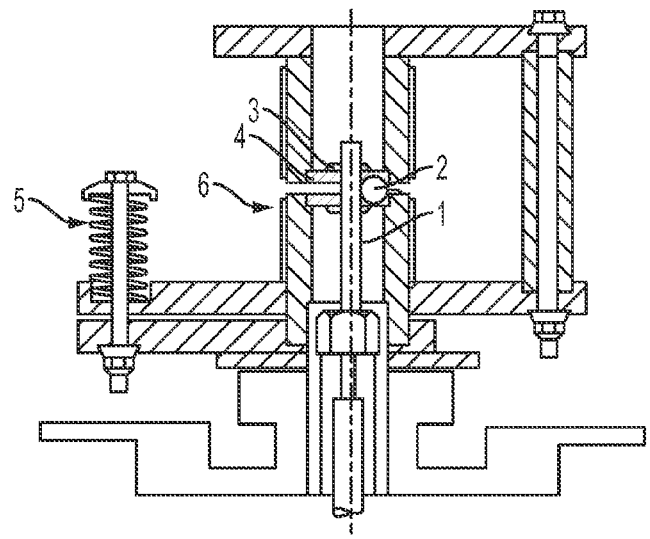
FIG. 8 is a schematic drawing of a rolling contact fatigue testing apparatus.

Rolling contact fatigue (RCF) tests were conducted using a modified RCF tester. A schematic of the tester is shown in FIG. 8. The "ball-on-rod" tester consists of a rotating cylindrical test specimen 1 (9.525 mm in diameter) stressed by rolling contact with three radially loaded balls 2 (12.7 mm in diameter) held spaced apart in a retainer 3. The balls 2 are loaded against the rod 1 by two stationary tapered races 4 at a predetermined calibrated thrust load applied by three compression springs 5. To accelerate failure, high Hertzian stresses were used. The test configuration was set such that pure rolling conditions exist between the rod and balls. A constant rolling speed of 1.8 m/s (3600 rpm) was used for all experiments.

In the present configuration, the test head is heated using band heaters 6. The test specimens 1 were continuously lubricated by dripping room temperature test lubricant onto the end of the specimen 1. An accelerometer, placed on the test head, was coupled with a shutdown device and monitored the vibrations of the assembly. When a preset vibration level was exceeded, thereby indicating the presence of fatigue spall or a surface crack, the motor, band heaters, and oil supply were automatically stopped. The test duration was recorded by an hour meter connected electronically to the motor. The test time required for a fatigue spall to develop on the rod was recorded, and the numbers of stress cycles were later calculated. Twenty tests were run on each test rod 1 at different axial positions for each lubricant/bearing material. New balls 2 were used for each test, and the races 4 were replaced after 20 tests.

The races 4 were made from VIM-VAR M50. Silicon nitride (Toshiba, TSN-03NH, Grade 5) rolling elements 2 were used to simulate a hybrid bearing configuration. Cages 3 were fabricated from AISI 4340.

A fully formulated polyolester base lubricant conforming to MIL-PRF-23699 (BP2197) specification was used as the lubricant with viscosity of 5 cSt @ 100° C. The calculated specific film thickness ($\lambda$) of values between 0.17-0.25 suggested that all tests were performed under boundary lubrication. The test specimens 1 were continuously lubricated at a constant flow rate of 22 ml/hr. The test lubricant was at room temperature prior to flowing into the test section.

To accelerate fatigue failure, a maximum Hertzian stress of 5.5 GPa (800 ksi) was used. The test was performed at 350° F. (177° C.). A surface-initiated fatigue spall on the rod 1 was the test failing criterion. Tests were suspended after 300 hours of testing time, if no fatigue spall initiation occurred on the rod 1. The RCF results were analyzed using a two-parameter Weibull distribution with suspensions. Failures of the M50 race and the $Si_3Ni_4$ ball were treated as suspensions. Also, the tests with a run time in excess of 300 hours without a fatigue spall were also treated as suspensions in the Weibull analysis.

Figure 9:
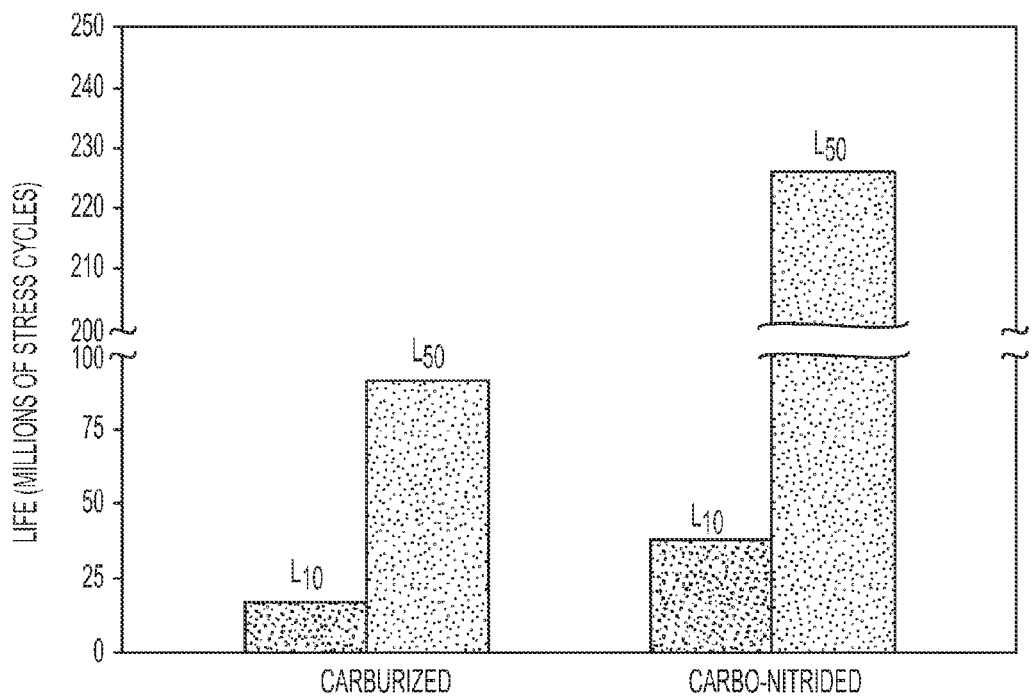
FIG. 9 shows a rolling contact fatigue life comparison between carburized and carbo-nitrided Pyrowear® 675.

As shown in FIG. 9, the carbo-nitrided P675 specimen showed statistically significant improved fatigue life compared to the carburized P675 specimen ($L_{10}$ life improved by 122% and $L_{50}$ life improved by 146%). While not wishing to be bound by theory, significant improvement in fatigue life will result in improved reliability, longer component life and reduction in maintenance costs.

Microstructure

The microstructure of the carbo-nitrided P675 specimen is shown in FIG. 10, in which fine, evenly-distributed carbides in the case can be seen.

Comparison with Other Steel Treatment Processes

An overall comparison of various steel treatment processes, as compared to carbo-nitriding according to the present teachings (bottommost entry) are shown below in Table 1. As can be seen, only the present carbo-nitriding technique was capable of providing both superior corrosion resistance and superior fatigue life performance.

TABLE 1

| Specific Surface Treatment | Corrosion resistance | Fatigue Life Performance |
|---|---|---|
| Carburized | poor | Accepted (used as base line) |
| Cr ion implantation* | poor | Not tested |
| TiN coating* | good | poor |
| TiN + Ag coating* | poor | poor |
| low plastic burnishing* | poor | acceptable |
| laser shock penning* | poor | not tested |
| Carbo-nitrided | superior | superior |

*Post carburization treatment

Representative, non-limiting examples of the present invention were described above in detail. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved stainless steel articles and methods for manufacturing the same.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The invention claimed is:

1. A bearing ring comprised of a carbo-nitrided martensitic stainless steel having a hardened case, comprising:
    a hard carburized case up to a depth of about 900-1125 µm,
    a presence of nitrogen or nitrides up to depth of 250 µm, 0.3-0.7 wt % nitrogen at the surface and 0.1-0.3 wt % nitrogen at a depth of 250 µm, and
    carbon in the range of 1.5 wt % to 2.0 wt % in the hardened case,
    wherein the bearing ring has a core consisting essentially of:
    0.02-0.50 wt % C, 0.1-1.5 wt % Mn, 0.10-2.0 wt % Si, 13.0-20.0 wt % Cr, 1.0-3.5 wt % Ni, 0.40-3.0 wt % Mo, 0.40-2.0 wt % V, and 1.0-10.0 wt % Co, the balance being Fe and unavoidable impurities, and the core of the bearing ring contains the following weight percentages of elements:
    Mo+V=0.8 to 4.0 wt % and
    Co+Ni=2.0 to 12.0 wt %.

2. The bearing ring according to claim 1, wherein the hardened case of the bearing ring has a hardness of at least 800 Hv (~63.7 HRc) at a depth between 0.010 to 0.039 inches.

3. The bearing ring according to claim 1, wherein the hardened case of the bearing ring has a hardness of between 800-850 Hv (~63.7 to 65.4 HRc) at a depth between 0.010 to 0.039 inches.

4. The bearing ring according to claim 1, wherein the hardened case of the bearing ring has a hardness of at least 63 HRc (~772 HV) at 300° F.

5. The bearing ring according to claim 1, wherein the hardened case of the bearing ring has:
    a hardness of between 800-850 Hv (~63.7 to 65.4 HRc) at a depth between 0.010 to 0.039 inches,
    a hardness of at least 63 HRc (~772 HV) at 300° F.,
    a hardness of at least 62 HRc (~745 HV) at 400° F. and
    a residual stress of at least 500 MPa.

6. The bearing ring according to claim 5, wherein at least one portion of the hardened case of the bearing ring comprises at least 16 volume percent of retained austenite.

7. The bearing ring according to claim 1, wherein at least one portion of the hardened case of the bearing ring comprises at least 16 volume percent of retained austenite.

8. The bearing ring according to claim 7, wherein the core of the bearing ring consists of:
    0.03-0.10 wt % C,
    0.5-1.0 wt % Mn,
    0.20-0.6 wt % Si,
    13.0-15.0 wt % Cr,
    2.40-3.0 wt % Ni,
    1.50-2.0 wt % Mo,
    0.40-0.80 wt % V, and
    5.0-6.0 wt % Co,
    the balance being Fe and unavoidable impurities.

9. The bearing ring according to claim 1, wherein the core of the bearing ring consists of:
    0.03-0.10 wt % C,
    0.5-1.0 wt % Mn,
    0.20-0.6 wt % Si,
    13.0-15.0 wt % Cr,
    2.40-3.0 wt % Ni,
    1.50-2.0 wt % Mo,
    0.40-0.80 wt % V, and
    5.0-6.0 wt % Co,
    the balance being Fe and unavoidable impurities.

10. A bearing ring comprised of a carbo-nitrided martensitic stainless steel having a hardened case, comprising:
    a hard carburized case up to a depth of about 900-1125 µm,
    a presence of nitrogen or nitrides up to depth of 250 µm, 0.3-0.7 wt % nitrogen at the surface and 0.1-0.3 wt % nitrogen at a depth of 250 µm, and
    carbon in the range of 1.5 wt % to 2.0 wt % in the hardened case,
    wherein:
    at least one portion of the hardened case of the bearing ring comprises at least 16 volume percent of retained austenite, and
    the bearing ring has a core consisting of 0.07 wt % C, 0.65 wt % Mn, 0.40 wt % Si, 13.00 wt % Cr, 2.60 wt % Ni, 1.80 wt % Mo, 0.60 wt % V, and 5.40 wt % Co, the balance being Fe and unavoidable impurities.

11. A bearing ring comprised of a carbo-nitrided martensitic stainless steel having a hardened case, comprising:
    a hard carburized case up to a depth of about 900-1125 µm,
    a presence of nitrogen or nitrides up to depth of 250 µm, 0.3-0.7 wt % nitrogen at the surface and 0.1-0.3 wt % nitrogen at a depth of 250 µm, and
    carbon in the range of 1.5 wt % to 2.0 wt % in the hardened case,
    wherein the bearing ring has a core consisting of 0.12 wt % C, 14.00 wt % Cr, 0.60 wt % V, 2.00 wt % Ni, 4.75 wt % Mo, 12.5 wt % Co, and 0.02 wt % Cb, the balance being Fe and unavoidable impurities.

12. The bearing ring according to claim 11, wherein at least one portion of the hardened case of the bearing ring comprises at least 16 volume percent of retained austenite.

13. A method for producing the bearing ring according to claim 1, comprising:
    (a) placing a bearing ring into a vacuum chamber, the bearing ring being comprised of a martensitic stainless steel consisting essentially of 0.02-0.50 wt % C, 0.1-1.5 wt % Mn, 0.10-2.0 wt % Si, 13.0-20.0 wt % Cr, 1.0-3.5 wt % Ni, 0.40-3.0 wt % Mo, 0.40-2.0 wt % V, and 1.0-10.0 wt % Co, the balance being Fe and unavoidable impurities,
    (b) vacuum carburizing the bearing ring within a temperature range of 1625-1680° F. by repeating a plurality of cycles comprising (i) introducing acetylene into the vacuum chamber and (ii) then evacuating the vacuum chamber to about 0.1 atm, and
    (c) then vacuum carbo-nitriding the bearing ring within a temperature range of 1575° F.-1625° F. by repeating a plurality of cycles comprising (i) introducing acetylene and ammonia into the vacuum chamber and (ii) then evacuating the vacuum chamber to about 0.1 atm, wherein the bearing ring according to claim 1 is formed.

14. The method according to claim 13, wherein the bearing ring has a hardness of at least 800 Hv (~63.7 HRc) at a depth between 0.010 to 0.039 inches.

15. The method according to claim 14, wherein the bearing ring contains at least 0.5 wt % nitrogen in at least one portion of the hardened case and at least 0.2 wt % nitrogen at a depth of about 200 µm.

16. The method according to claim 15, wherein the bearing ring exhibits a residual stress of at least 500 MPa in the hardened case.

17. The method according to claim 16, wherein at least one portion of the hardened case of the bearing ring comprises at least 16 volume percent of retained austenite.

18. The method according to claim 13, wherein:
a nitrogen:carbon differential ratio in step (c) is between about 6-8:1,
the total time for steps (b) and (c) is between 15-18 hours, and
wherein subsequent to step (c) the bearing ring is:
quenched in liquid nitrogen and
then tempered twice at 575° F.-625° F. for 2 hours.

19. The method according to claim 13, wherein the martensitic stainless steel in step (a) consists of 0.07 wt % C, 0.65 wt % Mn, 0.40 wt % Si, 13.00 wt % Cr, 2.60 wt % Ni, 1.80 wt % Mo, 0.60 wt % V, and 5.40 wt % Co, the balance being Fe and unavoidable impurities.

* * * * *